United States Patent
Appleby

[19]

[11] Patent Number: 5,953,908
[45] Date of Patent: Sep. 21, 1999

US005953908A

[54] METHOD AND APPARATUS FOR HEATING A CATALYTIC CONVERTER TO REDUCE EMISSIONS

[76] Inventor: Anthony John Appleby, 2810 Briar Creek Ct., Bryan, Tex. 77802

[21] Appl. No.: 08/946,713

[22] Filed: Oct. 8, 1997

Related U.S. Application Data

[63] Continuation-in-part of application No. 08/320,171, Oct. 7, 1994.

[51] Int. Cl.$^6$ .................................................. F01N 3/00
[52] U.S. Cl. ............................... 60/275; 60/274; 60/286; 60/303
[58] Field of Search .............................. 60/274, 284, 286, 60/303, 275, 285

[56] References Cited

U.S. PATENT DOCUMENTS

| | | |
|---|---|---|
| 3,311,097 | 3/1967 | Mittelstaedt . |
| 3,648,668 | 3/1972 | Pacheco . |
| 3,719,457 | 3/1973 | Nagamatsu . |
| 3,729,936 | 5/1973 | De Palma et al. . |
| 3,761,229 | 9/1973 | Schwartz . |
| 3,779,014 | 12/1973 | Nohira et al. . |
| 3,782,115 | 1/1974 | Johnson . |
| 3,815,337 | 6/1974 | Lenane . |
| 3,911,675 | 10/1975 | Mondt . |
| 4,332,219 | 6/1982 | Gonzalez . |
| 4,499,864 | 2/1985 | Lovercheck et al. . |
| 4,685,430 | 8/1987 | AP . |
| 4,763,610 | 8/1988 | Thomas . |
| 4,865,818 | 9/1989 | Merry et al. . |
| 4,939,902 | 7/1990 | Retallick . |
| 4,985,210 | 1/1991 | Minami . |
| 5,130,109 | 7/1992 | Wan . |
| 5,155,995 | 10/1992 | Kinnear et al. . |
| 5,163,290 | 11/1992 | Kinnear . |
| 5,184,462 | 2/1993 | Schatz . |
| 5,207,734 | 5/1993 | Day et al. . |
| 5,216,880 | 6/1993 | Aoki et al. . |
| 5,259,190 | 11/1993 | Bagley et al. . |
| 5,272,871 | 12/1993 | Oshima et al. . |
| 5,412,946 | 5/1995 | Oshima et al. ........................... 60/286 |
| 5,419,121 | 5/1995 | Sung et al. . |
| 5,441,401 | 8/1995 | Yamaguro et al. ......................... 431/4 |
| 5,845,485 | 12/1998 | Murphy et al. ............................ 60/274 |

FOREIGN PATENT DOCUMENTS

| | | |
|---|---|---|
| 2387357 | 11/1978 | France . |
| 2246218 | 3/1974 | Germany . |
| 4103668 | 8/1992 | Germany . |
| 4420715 | 1/1995 | Germany . |
| A 4318214 | 9/1992 | Japan . |
| 4318214 | 11/1992 | Japan . |
| 6033748 | 2/1994 | Japan . |
| 9306850 | 7/1993 | WIPO . |

*Primary Examiner*—Edward K. Look
*Assistant Examiner*—Binh Tran
*Attorney, Agent, or Firm*—Gunn & Associates, P.C.

[57] ABSTRACT

A mixture of hydrogen and air is introduced onto the face of the catalytic monolith of a catalytic converter in the exhaust line of a cold internal combustion engine. The hydrogen and the oxygen from the air spontaneously combine exothermically, thereby pre-heating the catalytic converter. Pre-heating the catalytic converter significantly improves the effectiveness of the catalytic converter in eliminating undesirable emissions of the internal combustion engine. The hydrogen is preferably produced on-board the vehicle using the system. The hydrogen source may also be coupled to the internal combustion engine to be burned by the engine during startup in the absence of gasoline to minimize the production of unacceptable emissions while the catalyst is brought up to light-off temperature. The hydrogen and the oxygen are preferably metered to provide a predetermined concentration of oxygen and hydrogen and are preferably mixed in a mixing chamber prior to introduction to the catalyst.

16 Claims, 8 Drawing Sheets

METHOD AND APPARATUS FOR HEATING A CATALYTIC CONVERTER TO REDUCE EMISSIONS

This is a continuation-in-part of application Ser. No. 08/320,171, filed Oct. 7, 1994.

BACKGROUND OF THE INVENTION

The present invention relates generally to the field of catalysis for the reduction of emissions from internal combustion engines. More particularly, the present invention relates to a method and apparatus for heating a catalyst by spontaneous combustion of hydrogen introduced into the catalyst. More particularly still, the present invention relates to the conditioning through preheating of a standard three-way or two-way catalytic monolith in a vehicle powered by an internal combustion engine, such as an automobile.

The control and suppression of unwanted emissions created by the operation of an internal combustion engine is a primary consideration for engine designers and vehicle manufacturers because of nearly world-wide governmental requirements regarding acceptable emission levels. Over eighty percent (80%) of the unacceptable emissions or pollutants created by internal combustion engines equipped with catalytic converters occur during cold start operations. These pollutants are emitted for a period of one to three minutes after cold engine starting, in large part because that is the time period required for the catalyst to reach an efficient operating temperature. Therefore, even though the engine exhaust is flowing through the catalytic converter, until the exhaust heats the catalytic converter to its operating range from engine start up, the exhaust flow is only slightly catalyzed during that time period.

In order to meet governmental emission standards for internal combustion engine exhaust, a catalytic converter is located in the exhaust stream of the engine. The converter typically includes a canister holding a suitable catalyst, such as a three-way catalytic converter (TWC) catalyst monolith, that will oxygenate unburned, unacceptable components in the exhaust stream including hydrocarbons ("HC"), their partially oxidized derivatives such as aldehydes and carbon monoxide ("CO"), and at the same time reducing nitrogen oxides ("$NO_x$"), after almost stoichiometric fuel burn with oxygen in the cylinders of the engine. The exhaust gas is passed through the catalyst monolith, thereby completing the oxygenation of unburned HC and CO, and the reduction of $NO_x$ in the exhaust to convert these unacceptable emissions into acceptable emissions. Certain unacceptable emissions in the exhaust stream, including unburned hydrocarbons and carbon monoxide, require an oxidation reaction to destroy them so that they end up as the corresponding oxides, e.g. water and carbon dioxide. On the other hand, $NO_x$ requires a reduction reaction to develop $N_2$ and $O_2$. In fact, the $O_2$ product of this reduction contributes to the oxidation of the HC and CO in the exhaust.

TWC catalysts are currently formulated and designed to be effective over a specific operating range of both lean and rich fuel/air conditions and a specific operating temperature range. These particulate catalyst compositions enable optimization of the conversion of HC, CO, and $NO_x$. This purification of the exhaust stream by the catalytic converter is dependent on the temperature of the exhaust gas and the catalytic converter works optimally at an elevated temperature, generally at or above 300° C. The time span between when the exhaust emissions begin (i.e., "cold start"), until the time when the substrate heats up sufficiently for the catalyst to work efficiently, is generally referred to as the light-off time. Light-off temperature is generally defined as the temperature at which fifty percent (50%) of the emissions from the engine are being converted as they pass through the catalyst.

The conventional method of heating the catalytic converter is to heat the catalyst by contact with high temperature exhaust gases from the engine. This heating, in conjunction with the exothermic nature of the oxidation reaction occurring at the catalyst, will bring the catalyst to light-off temperature. However, until the light-off temperature is reached, the exhaust gas passes through the catalyst relatively unchanged. In addition, the composition of the engine exhaust changes as the engine heats from the cold start temperature, and the catalyst is designed to work best with the composition of the exhaust stream present at the normal elevated engine operating temperature.

There have been several attempts to shorten or avoid the time between cold start and light-off of the catalytic converter. Current techniques employ one or more of the following methods: electrical heating of the exhaust gases and/or of the catalytic converter itself; thermal insulation; multi-chambered configurations of the catalytic converter; and/or placing the catalytic converter adjacent to the engine for heating. All of these methods have drawbacks and limitations.

Placing the catalytic converter almost immediately adjacent to the engine is not feasible because of the tendency to overheat the catalyst with resulting accelerated degradation of the catalyst due to excessive heat. Thermal insulation is also not an acceptable option because of the same problems, especially during operation under maximum operating temperature ranges.

Electrical heating of catalytic converters ("EHC") has been a popular proposed method of attempting to preheat the catalyst monoliths. Limitations on the equipment and process, however, affect the utility of this method. The primary limitation on electrical preheating is the electrical energy required by the heater. The typical car battery is not a practical power source to supply the electrical power because the electrical load on the vehicle battery during the period required may exceed the rated battery output. In any event, the load placed on a typical 12 volt vehicle battery will shorten the lifetime of the battery. Also, there is a measurable delay between the time the operator of the vehicle places the ignition switch in the "on" position and the time the heater brings the catalyst to light-off temperature.

Typically, in the interval between start up and light-off, the exhaust stream is oxygen deficient. Because the catalyst requires oxygen to complete the catalytic reaction, supplemental air must be blown over the catalyst. Even when using a secondary air flow to overcome oxygen deficiency, the secondary air flow must be closely controlled to avoid an excess of oxygen, in which case the catalytic converter is less effective in reducing $NO_x$. However, it should be noted that $NO_x$ contributes a very small portion of unacceptable emissions when an engine is cold, most of the emissions that must be dealt with comprise HC and CO and the like.

An alternative to battery powered electrical heating has been to decrease the strain on the power supply by supplying the power directly from an alternator rather than directly from the vehicle battery. An alternator powered, electrically heated catalyst ("APEHC") still requires a 5 to 10% increase in battery capacity to cope with the EHC start-up scenario. Even with the APEHC system, there still is a concern with respect to battery capacity because electric heating is needed for an extended period of time, i.e., more than 25–30 seconds. In addition, the maximum alternator power output required in the APEHC system requires a complicated switching mechanism and an altered alternator speed between 3,000 and 4,500 rpm during the heat up time period, and the alternator must be oversized.

The multi-chamber configurations of catalytic converters generally conform to one of two theories. In one multi-chamber configuration, a small portion of catalyst known as a "starter catalyst" is positioned upstream from the primary catalyst. This "starter catalyst" is generally closer to the exhaust manifold. This location, in conjunction with a smaller thermal mass associated with its smaller size, causes the catalyst to heat much more quickly than a single catalyst. This configuration, however, is generally unacceptable because the starter catalyst in the exhaust stream creates a higher back pressure which reduces the overall engine efficiency and robs the engine of power output.

Another method of providing multiple chambers in the exhaust flow includes a first catalyst having low temperature characteristics used only during cold start conditions, and, after the catalyst temperature ranges rise to a selected elevated level, the exhaust gas flow is switched to pass through the conventional catalytic converter configuration. A variation of this approach is to run all cold start emissions through a separate absorber (such as zeolite or a metal sieve-type substance) wherein unacceptable emissions are captured and later released back into the exhaust stream. This method, however, is impractical because of the complicated switching mechanism used to divert flow to the absorber, the size and space requirements of the absorber, and the impracticality of releasing the unacceptable emissions from the absorber back into the exhaust stream.

Finally, one method runs the engine excessively rich in the cold start condition and ignites the resulting super-rich mixture to directly heat the catalyst. This approach has proved wholly unreliable and has other serious drawbacks, including reduced engine and catalyst life.

To date, there has not been a catalytic converter heating system which gives almost instantaneous heating of the catalytic converter without the inherent drawbacks stated above.

Thus, there remains a need for an improved catalytic converter system that reduces ineffective catalytic action immediately after cold start-up of an engine. Such a system must be simple and must not reduce the rated lifetime of the engine, the catalytic converter, or the battery components of the vehicle.

SUMMARY OF THE INVENTION

Accordingly, the present invention provides a method and apparatus for reducing undesirable emissions from an internal combustion engine by using a gas that spontaneously combusts in the presence of a catalyst to heat the catalyst into its operating range in a minimal amount of time. In a preferred embodiment, the catalyst is heated by providing a controlled flow of hydrogen and a source of oxygen, such as air, into the exhaust line or pipe, preferably at a point between the engine manifold and the catalytic converter. The hydrogen combusts with the oxygen in the presence of the catalyst to produce water. This exothermic combustion provides localized heat at the catalyst which raises the temperature of the catalyst material.

The hydrogen is preferably supplied from an electrolyzer on board the vehicle which is supplied with DC power from the vehicle's alternator via an AC/DC converter. Such an electrolyzer produces hydrogen and oxygen from water. The oxygen so produced is vented while the hydrogen is accumulated during non-cold engine operations for release during engine start up and cold operating conditions. Sufficient hydrogen may be stored in a hydride such as $LaNi_5$ or $FeTi$ or may be accumulated in a pressure tank or other container such that there is hydrogen for several starts. The source of water may be distilled water; however, windshield washer fluid may also be used to eliminate the need for another storage facility for water.

It is well recognized by those of skill in the art of catalytic converter design that some monolith compositions more quickly and easily reach light-off temperatures than others. Consequently, the present invention is especially advantageous when applied to catalysts that are difficult to bring to light-off temperature by applying a small layer or film of a material that is more reactive to hydrogen and is thus more rapidly heated by spontaneous combustion of hydrogen. Such a layer or film could be applied to a face of the slow-heating monolith or could be distributed throughout the converter, as design requirements dictate. Rapid exothermic heating of the applied catalyst quickly brings the entire structure to a temperature at which normal, efficient catalytic action occurs.

In another preferred embodiment of the invention, a small amount of stored hydrogen may be supplied to the fuel injection system of the vehicle to assist in cold starts. This allows instant firing of the engine, even with fuels with low vapor pressure, such as methanol, ethanol, or low Reid vapor pressure gasoline.

BRIEF DESCRIPTION OF THE DRAWINGS

These and other features and advantages of the invention will become apparent from the following description when read in conjunction with the accompanying drawings, wherein.

DETAILED DESCRIPTION OF PREFERRED EMBODIMENTS

The present invention provides a method and apparatus for thermally conditioning a catalyst in order to enhance the conversion of unacceptable emissions emanating from an internal combustion engine into water and other acceptable emissions.

Figure 4:
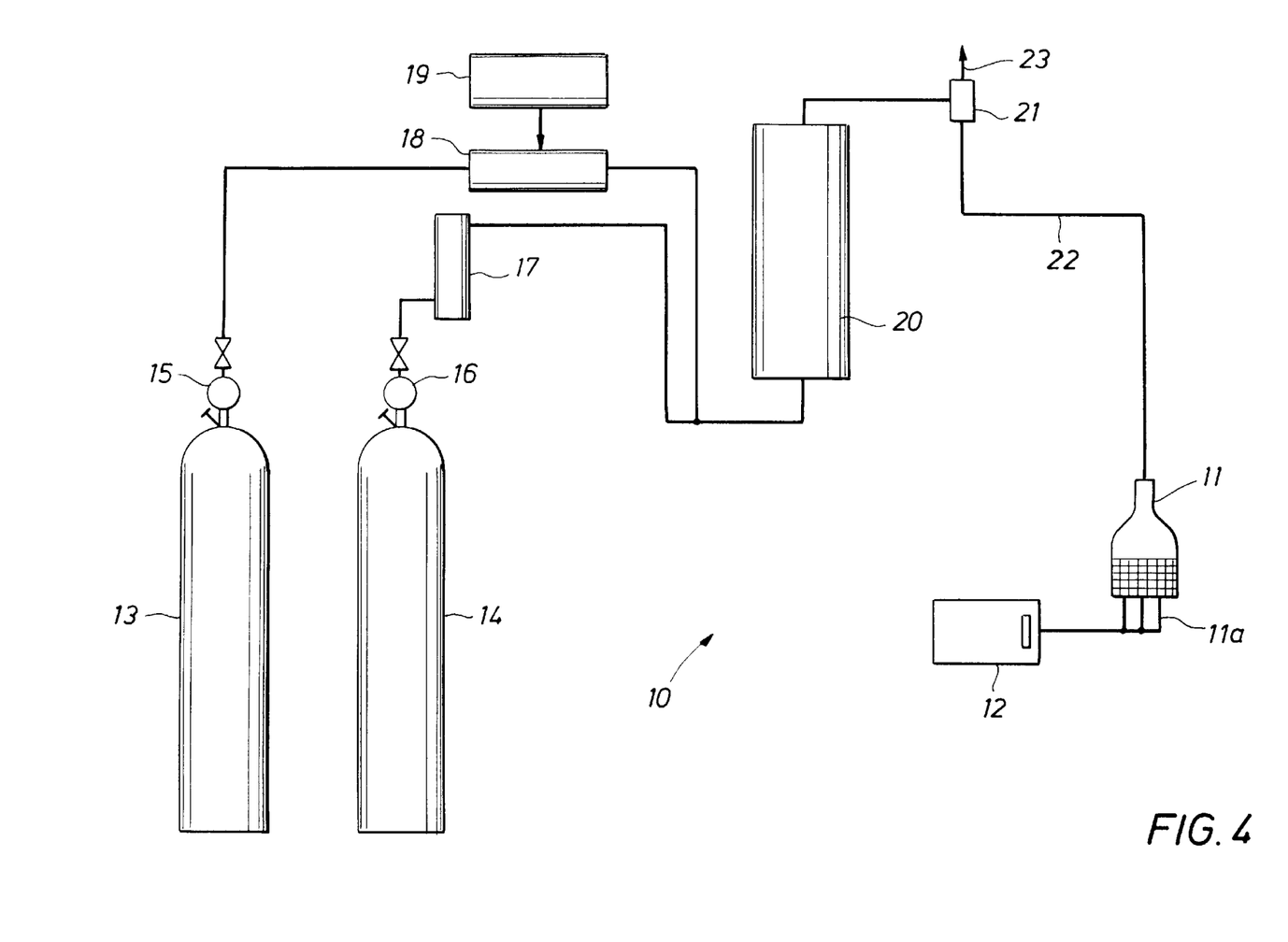
FIG. 4 is a schematic of a test setup to assist in the determination of the ideal parameters of a system functioning in accordance with the teachings of the present invention.

Referring first to FIG. 4, the schematic depicts the general configuration of a conditioning system 10 for catalytically enhancing emission reactions. The system 10 includes a catalytic converter 11, a metered hydrogen supply 13, and a metered air supply 14. Additionally, one or more thermocouples 11a are implanted at various positions along the radial and axial directions of the catalytic converter. The thermocouples are connected to a data logger 12, capable of recording the temperature of the catalyst as a function of time. The system 10 of FIG. 4 is particularly useful in demonstrating the efficacy of the present invention and for determining the optimum flow rates of hydrogen and air and other system parameters.

The flows of hydrogen and air from supplies 13 and 14 are controlled by valves or regulators 15 and 16, respectively. The regulator 16, which controls the air supply, is preferably coupled to a rotameter 17, which measures the air flow rate. The metered air then flows to a mixing chamber 20. The flow of hydrogen, which is controlled through a valve or regulator 15 and regulated by an electronically controlled mass flow controller 18 in conjunction with the controller 19, is also delivered to the mixing chamber 20.

In the mixing chamber 20, the hydrogen and air are thoroughly mixed before passing through a three way valve 21. The three way valve 21 operates to provide a bypass of the hydrogen and air mixture directly to the surrounding environment via an outlet 23 or to a conduit 22, through which the hydrogen and air mixture are introduced into the catalytic converter 11. This configuration allows for a widely varying flow of hydrogen and air to a catalytic converter to determine the proper hydrogen/air ratios for practicing the present invention.

Figure 5:
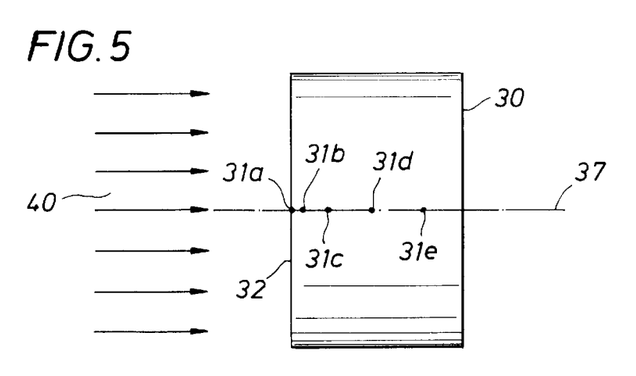
FIG. 5 is a sectional view of a simplified representation of a catalytic converter monolith showing air and hydrogen flow in the axial direction.
Figure 5A:
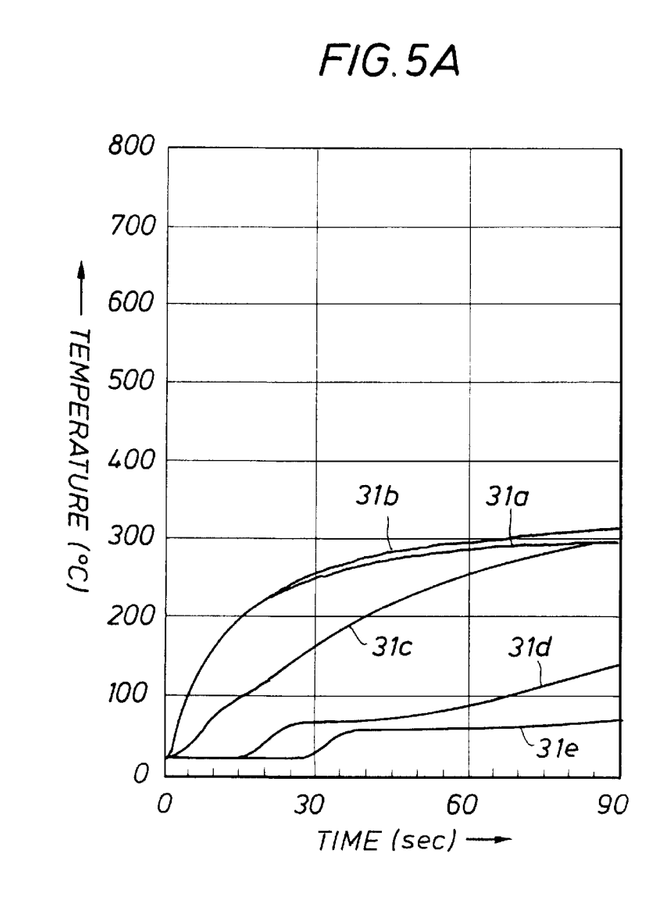
FIGS. 5A, 5B, 5C, 5D, and 5E are temperature plots of the variation of temperature with time along the axial length of a catalytic converter monolith for different hydrogen concentrations in a flowing gas stream.
Figure 5B:
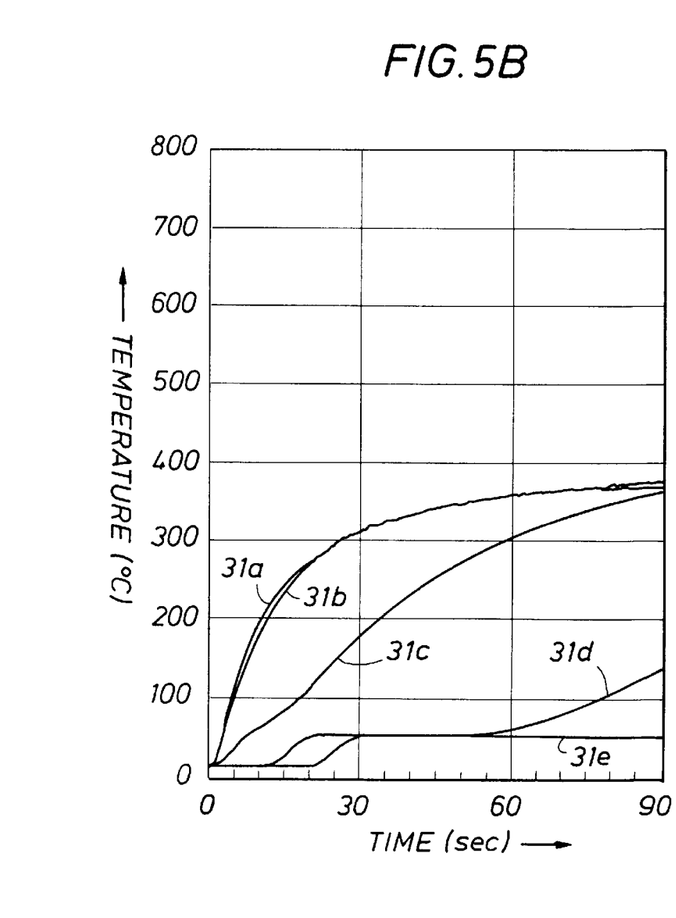
Figure 5C:
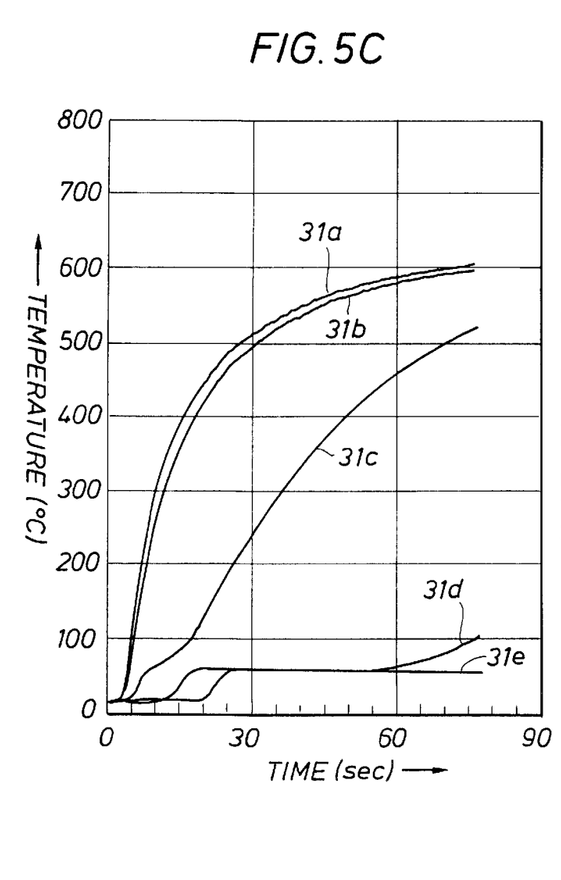
Figure 5D:
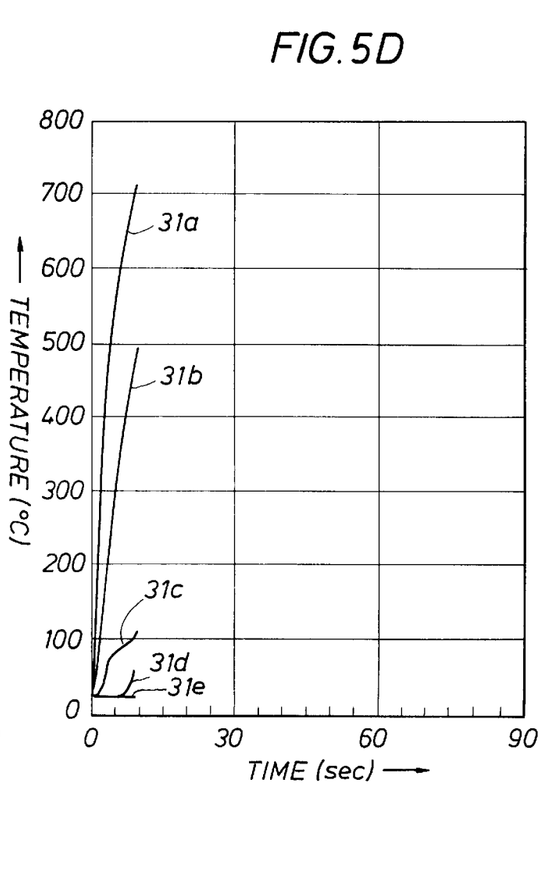
Figure 5E:
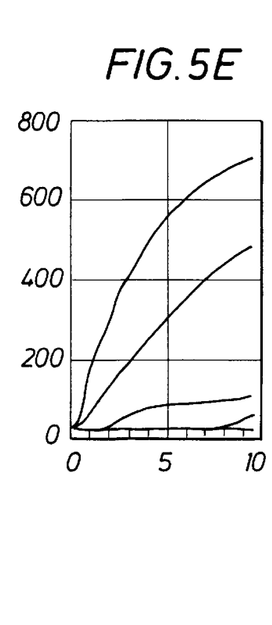

FIG. 5 depicts a catalytic converter monolith 30 in the catalytic converter 11 that may be conditioned with the present invention. Arrows 40 represent the stream of air and hydrogen passing through conduit 22 and into contact with the monolith 30 along a central axis 37. Points 31a, 31b, 31c, 31d, and 31e represent the location of thermocouple probes, as generally represented by 11a in FIG. 4, for the measurement of temperatures along the axial or flow direction into the catalytic converter.

Figure 6:
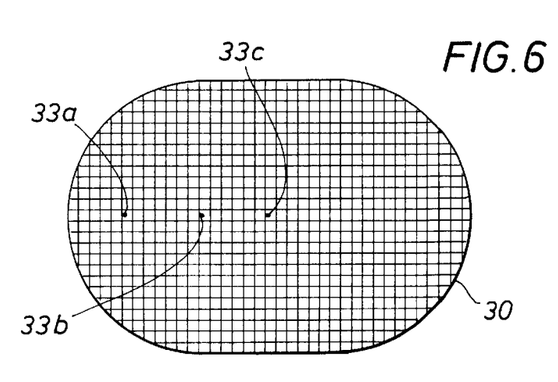
FIG. 6 is a sectional view of a simplified representation of a catalytic converter monolith for temperature measurements along the major radial direction in the monolith.
Figure 6A:
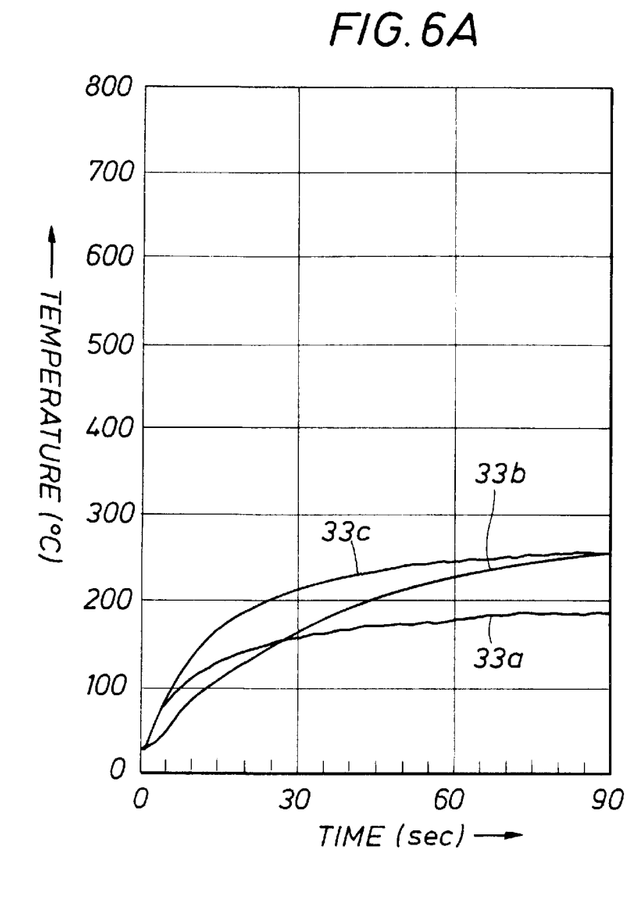
FIGS. 6A, 6B, 6C, 6D, and 6E are temperature plots of the variation of temperature with time along the major radial direction of a catalytic converter monolith for different hydrogen concentrations in a flowing gas stream.
Figure 6B:
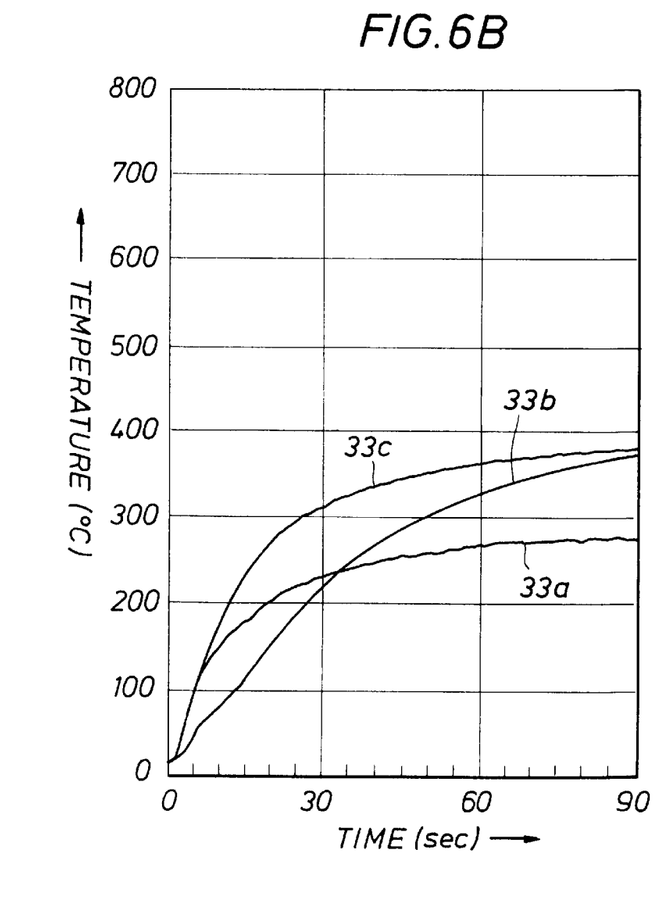
Figure 6C:
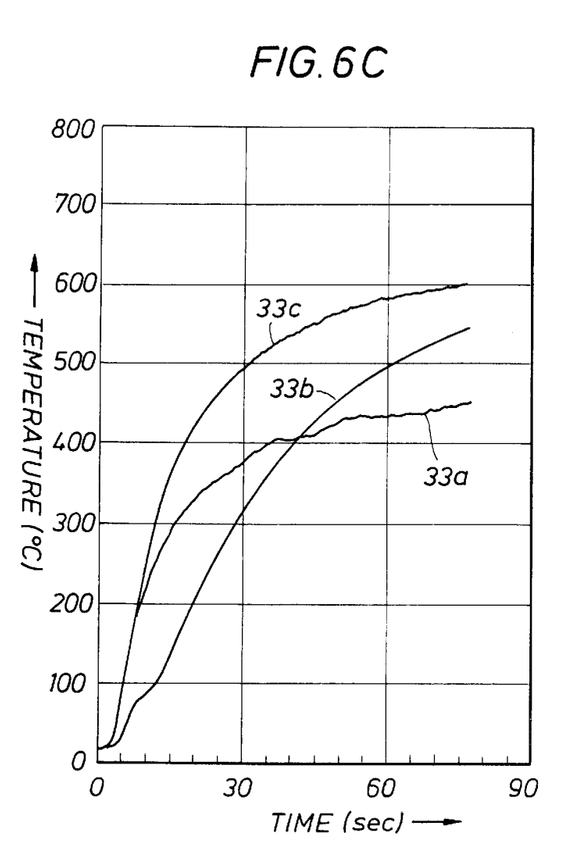
Figure 6D:
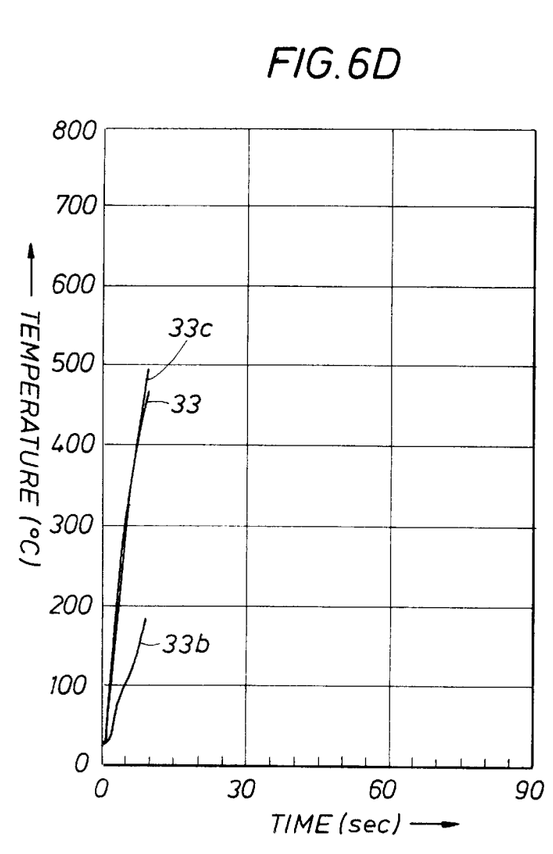
Figure 6E:
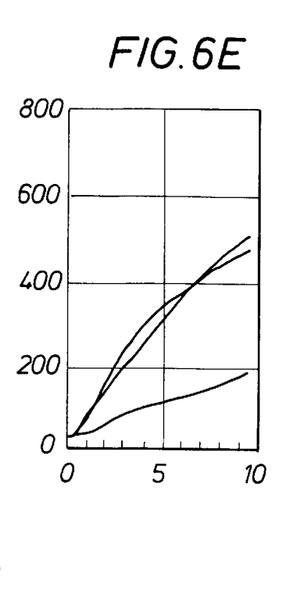

FIG. 6 depicts the radial distribution of a plurality of probes 33a, 33b, and 33c within the monolith 30. Below are listed some results for variously changing parameters as determined by the distribution of the thermocouple probes 31a–31e and 33a–33c.

FIGS. 5A–E, inclusive, depict test results of the distribution of temperatures detected by the thermocouples distributed as shown in FIG. 5 for varying concentrations of hydrogen. Similarly, FIGS. 6A–E, inclusive, depict test results of the distribution of temperatures detected by the thermocouples distributed as shown in FIG. 6 for the same concentrations of hydrogen. These plots clearly show the effectiveness of the heating on the face of the catalytic converter monolith and will assist those of skill in the art in selecting optimum fluid flow rates in a particular application.

Figures 1, 3:
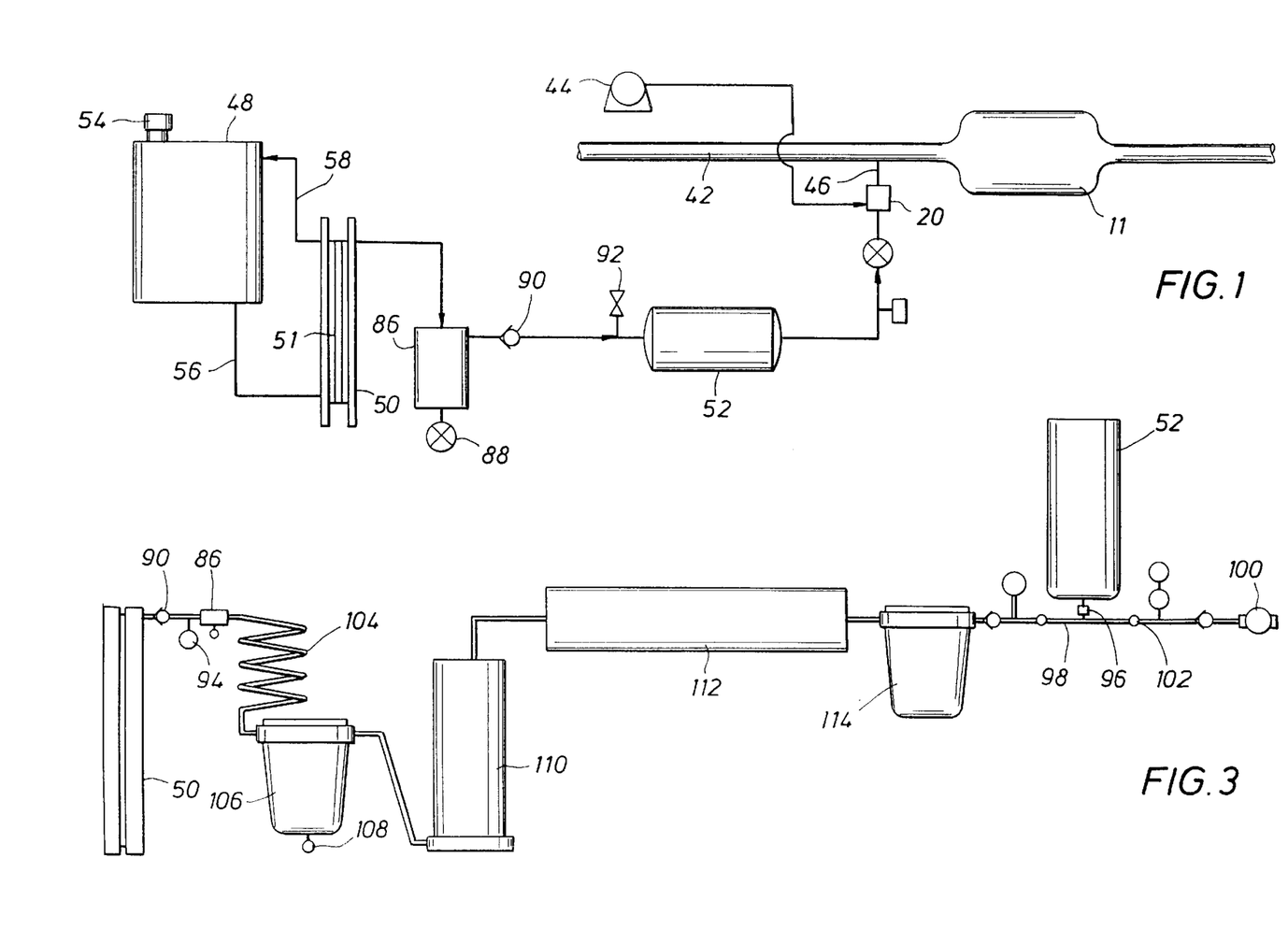
FIG. 1 is a schematic diagram of the apparatus of the present invention for heating a catalytic converter.
FIG. 3 is a schematic of a hydrogen capturing and handling detail of the system of the present invention.

FIG. 1 shows an overall system of the present invention. In this system, the catalytic converter 11 is located in an exhaust line 42 from a vehicle's exhaust manifold, as shown. The exhaust line 42 is provided with air from an air pump 44 and hydrogen from a hydrogen inlet line 46. The air pump could be any suitable air source, such as a receiver, for injecting air into the mixing chamber 20 at suitable pressure and volumetric flow rate to achieve the ideal air/hydrogen ratio mixture.

The hydrogen source portion of the system of FIG. 1 provides another feature of the present invention. The major components of the system include a reservoir 48, an electrolyzer 50, and a hydrogen storage cylinder 52. As shown in FIG. 1, the electrolyzer 50 may preferably comprise a plurality of stacked identical cells 51. The reservoir 48 serves both as a water reservoir and as a separator for oxygen and water. In a preferred embodiment, the reservoir 48 may be a vehicle's windshield washer fluid storage container. A port 54 permits the introduction of water into the reservoir and also serves as a vent to atmosphere for oxygen. Water flows by gravity drain or is pumped from the reservoir 48 to the electrolyzer 50 via a drain line 56. As the electrolyzer develops hydrogen and oxygen, the oxygen and entrained water flows naturally back to the reservoir 48 via a return line 58.

Figure 2:
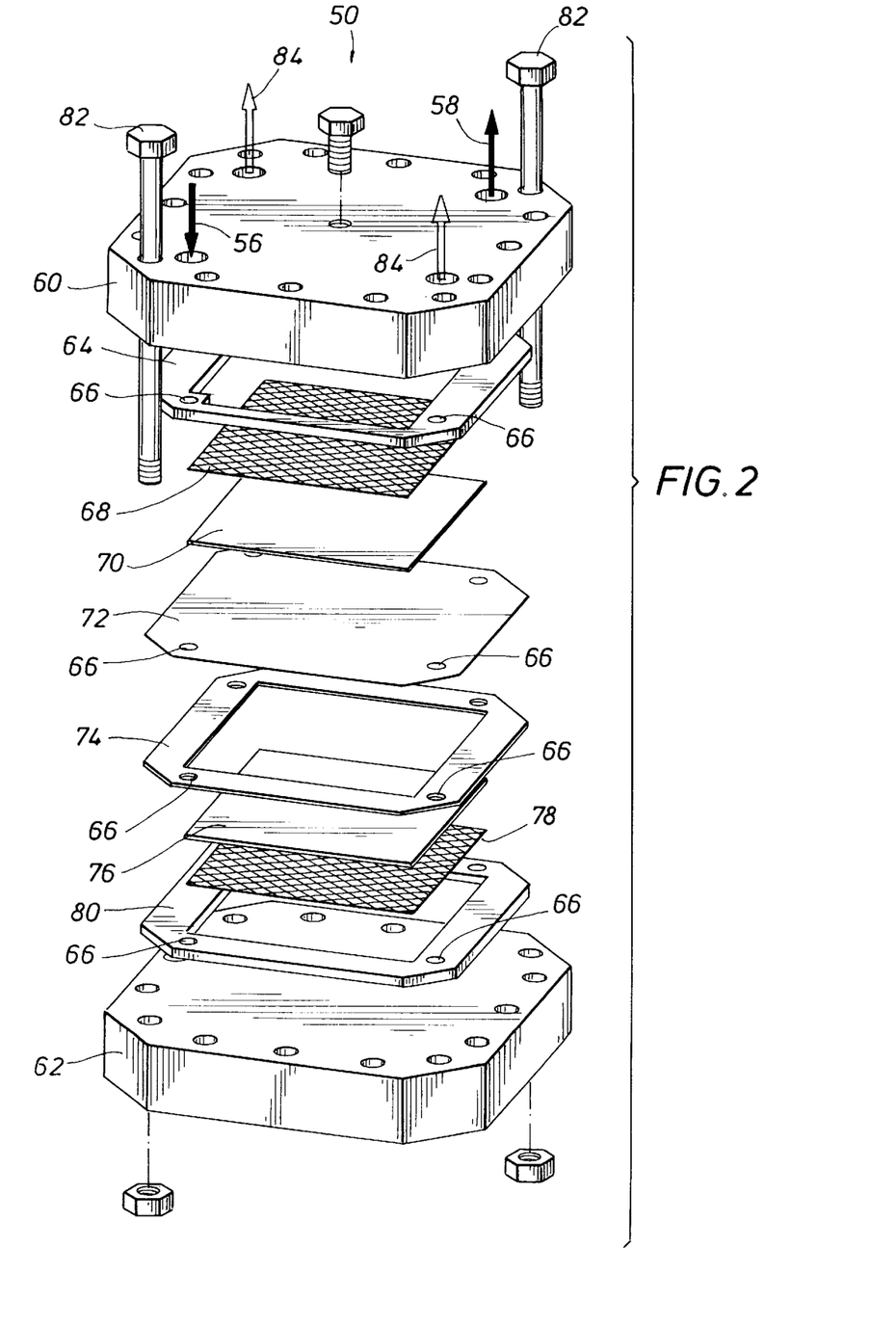
FIG. 2 is an exploded view of a preferred electrolyzer that may be employed in the present invention.

The next major component of the hydrogen source is the electrolyzer 50, shown in greater detail in FIG. 2. In the following description of the electrolyzer 50, the materials of construction referred to as "preferred" are the materials actually used in a test device to prove that the invention would work for its intended purpose. In commercial production models of the present invention, where possible, less expensive materials will be used throughout, such as carbon steel for titanium where possible, and plastic such as polypropylene where heat and stress will permit the use of such material.

The electrolyzer 50 may be referred to herein as a proton exchange membrane (PEM) electrolyzer 50. The proton exchange membrane itself may prove corrosive in this environment in contact with certain substances, thus requiring the careful selection of the materials of construction of the electrolyzer. For example, the PEM should only contact carbon or graphite. However, those of skill in the art will readily recognize where less exotic materials than those listed in the following discussion that are located away from the PEM material itself and the oxygen electrode catalyst can be readily employed without penalty. For example, graphite will be the material of choice in certain structural elements, and not some obvious candidates such as copper, aluminum, or iron, which can corrode thus forming ions that can poison the oxygen and/or hydrogen electrode catalysts.

The PEM electrolyzer 50, formed as a stack as shown in FIG. 2, includes a pair of endplates 60 and 62. The endplates 60 and 62 are preferably titanium and measure 4.2"×4.2"× ¾". Adjacent the top endplate 60 is an anodic cell frame 64. The cell frame 64 is preferably a carbon fiber-filled Teflon sheet, sold under the trademark Zymaxx by Du Pont. The cell frame 64 retains a 1:1 molar ratio of iridium and ruthenium dioxides ($IrO_2$/$RuO_2$) as the anodic electrocatalyst. The cell frame 64 also includes a plurality of flow ports 66 to permit the supply of reactant (water) and/or removal of electrolysis products (hydrogen or oxygen gases). Below the cell frame 64 is an expanded titanium metal current collector (flow field) 68, preferably 25 Ti 40-3/32 from Exmet Corp. An anode substrate 70 is preferably a porous titanium plate measuring 2.49"×2.49"×0.05". Below the anode substrate 70 is a proton exchange membrane 72, cut from a sheet of Nafion 117 from Du Pont which serves as a solid electrolyte material and which is 175 μm thick.

FIG. 2 depicts a gasket 74, one of perhaps several installed where required. Gaskets 74 are stamped from 0.033" thick fluorosilicone sheet (Viton) and from 0.005" thick unsintered PTFE sheet. The electrolyzer 50 further includes a cathode substrate 76 like the anode substrate 70 and an expanded titanium flow field 78 like the titanium flow field 68.

Finally, the PEM electrolyzer 50 includes a cathodic cell frame 80 formed of polychlorotrifluoroethylene (PCTFE) sheet, sold under the trademark KEL-F by Afton Plastics. The cathodic cell frame 80 retains a fuel cell gas diffusion electrode containing high surface area colloidal platinum, supported on platinum black, having a platinum loading of 4.0 mg/cm$^2$ as the cathodic electrocatalyst layer.

As shown in FIG. 2, the various components of the PEM electrolyzer are stacked together and retained with a plurality of tie rods 82, preferably 16 such tie rods. Stainless steel tubing, such as SS316, are then screwed into four threaded ports on one of the titanium endplates. These ports are the water inlet port 56, the oxygen outlet port 58, and a pair of hydrogen outlet ports 84. To minimize electrical contact resistances, the titanium endplates 60 and 62 and the expanded titanium metal current collectors 68 and 78 may be electroplated with a thin film of gold.

The cathode and the anode of the electrolyzer are of special construction. The cathodic electrode structure for hydrogen evolution is fashioned from commercially available fuel cell gas diffusion electrodes from E-TEK of Natick, Mass. This structure comprises a hydrophobic gas diffusion layer on a carbon cloth backing, which acts as a support for the active hydrophilic electrocatalyst layer. This active layer contains high surface area colloidal platinum (~100 m$^2$/g), supported on carbon black (60 wt % Pt on C), yielding a platinum loading of 4.0 mg/cm$^2$. The cathodic electrode structure, having an area of 40 cm$^2$, was hot-pressed onto one side of a segment of precleaned Nafion 117 PEM material. Hot-pressing was carried out between the plates of a hot-press, elevated to 200° C. for 60 seconds, and using a force of 15,000 pounds.

For the anodic electrocatalyst layer, a 1:1 molar ratio of iridium and ruthenium chlorides are dissolved in ca. 8 ml of concentrated HCl and heated to almost dryness. The resulting chlorides are then dissolved in isopropanol to make an ink-like coating. A porous titanium plate, 0.05" thick, of about 50% porosity, made from sintered titanium spheres of about 0.005" in diameter from Astro Met of Cincinnati, Ohio, is etched in 12% HBF$_4$ for 60 seconds and rinsed with isopropanol. This substrate is then coated with the ink-like mixture and the solvent evaporated under low heat of about 90° C. The coating and drying procedure is repeated seven times, then the electrode is heated in a furnace at 400° C. for 10 minutes in ambient air. The coating, drying and furnace treatment is repeated twice more, but with a final baking time of two hours instead of 10 minutes.

Returning to FIG. 1, in addition to the reservoir 48 and the electrolyzer 50, the system includes a hydrogen storage cylinder and various supporting components. These components include a liquid water trap 86 to eliminate most of the entrained water from the hydrogen from the electrolyzer, a solenoid valve 88 to blow out the trap, a check valve 90, and a pressure relief valve 92 to protect the system against overpressurization. FIG. 3 depicts additional details and a preferred arrangement of the hydrogen gas handling and capture system.

As previously described, the electrolyzer 50 includes a proton exchange membrane in its stacked construction so that generated oxygen is vented to the water source reservoir and the hydrogen generated can be accumulated at pressure. Prior to operation the system of FIG. 3 permits purging with an inert gas, such as nitrogen. For safety reasons, all air is first removed from the system by attaching a nitrogen gas feedline at a purge gas inlet 94 downstream of a check valve 90. During the purging operation, the hydrogen storage cylinder or vessel 52, preferably made of a metal hydride, is detached at a quick disconnect 96. This operation effectively seals both the vessel 52 and a gas line 98, to keep the purge gas out of the vessel 52. The remainder of the system is then purged from the purge gas inlet 94 through a back pressure regulator 100.

To charge the system with hydrogen, a needle valve 102 between the storage vessel 52 and the back pressure regulator 100 is shut. Hydrogen gas generated by the electrolyzer is processed through a four-stage process to remove entrained water (liquid or vapor) and any oxygen contaminant from the hydrogen stream before storage. The first step involves removal of a small amount of entrained liquid water coming from the electrolyzer in the hydrogen gas. This entrained liquid water is removed without a pressure loss by means of the entrained liquid water trap 86. The second step involves cooling the hydrogen gas stream from the electrolyzer temperature to ambient in a condensing coil 104. The electrolyzer is typically at least 20° C. above ambient, with the exact temperature depending on electrolyzer operating conditions. This second step condenses a substantial portion of the water vapor in the hydrogen gas stream. This condensed water could absorb a significant amount of alcohol, which may be present during operation using windshield washer fluid as the electrolyzer reactant feed. The condensate is collected in a condensate collector 106 and removed through a drain valve 108.

At this point, the hydrogen gas stream is still saturated with water vapor, but now at a lower temperature. This saturated gas stream is next passed into a zeolite-filled gas drier 110. This drier absorbs water vapor and any alcohol vapor present when using a windshield washer fluid feed. Any oxygen contaminant present in the hydrogen gas stream is then eliminated in a catalytic recombiner or oxygen eliminator 112 to reduce it to water. Final clean-up of the hydrogen gas stream is accomplished in a second zeolite absorber bed in a polishing drier 114. The polishing drier removes traces of water produced by the catalytic recombiner 112.

The hydrogen gas handling system of FIG. 3 is designed for relatively short term operation; longer term operations, for example 100,000 miles, would utilize other methods of water removal known in the art. A satisfactory metal hydride hydrogen storage unit is available from Hydrogen Consultants of Littleton, Colo. Such an available unit can store 30 liters of hydrogen, which can be delivered at 30–45 psig, with recharging using hydrogen gas at 100–200 psig.

As previously described, it has been found that the introduction of a relatively small percentage of hydrogen in the air stream of a typical automobile gas exhaust provides nearly spontaneous heating of a major portion of a face 32 (FIG. 5) of the catalyst material almost immediately following ignition in the internal combustion engine providing the exhaust gas. This heating along the face 32 of the converter is fortuitous because it has been found that the most effective site for providing local heating is along and near the upstream face 32 of the catalyst monolith 30. In fact, where the monolith 30 is made of a material that heats slowly when used in association with the present invention, the face 32 may comprise a more reactive catalytic material to bring the entire catalytic converter to light-off more quickly.

In addition, the heat supplied by the spontaneous combustion of the hydrogen in the presence of the catalytic converter 30 produces only a small quantity of water as a product of the reaction, which does not degrade the performance of the catalytic converter.

A system 10 built in accordance with the present invention as depicted in FIGS. 4, 5, and 6 have provided preferred parameters of air and hydrogen flow. The air flow rate, depending on engine size and tuning parameters, typically falls in the range of 40 to 250 liters per minute (lpm). The ideal range is between 80 and 200 lpm, depending on engine size. Effective concentrations of hydrogen for these flow rates are one to twenty-eight volume percent, with a preferred range of five to eighteen percent. The ideal range of hydrogen concentration, again depending on engine size, has been found to be eight to fifteen percent. For example, at 150 lpm flow rate across the catalytic converter, the ideal range for hydrogen concentration in that flow is 12 to 13 volume percent. Under those conditions, light-off temperature at the face 32 is reached in about one second. At 90 lpm and at 8.5 to 11 volume per cent hydrogen, light-off is achieved in about two seconds.

The power consumption at the catalyst varies depending on the flow rate and the concentration of hydrogen. For example, at a flow rate of thirty to fifty 1pm and a concentration of 10–11½ volume percent hydrogen, the power required to heat the monolith to light-off is approximately 1.5 watt hours. Similar results in an EHC unit require approximately 10 to 15 watt hours.

The present invention is also suitable for use in low ambient temperature conditions, as low as −7° C. or lower. Depending on the active catalyst compositions used, the amount of time required to achieve light-off may double. In those conditions, it may be desirable to add a small electrical heater, which would be much smaller than an EHC heater and require only about 200 watts of power, in order to achieve the results at normal ambient temperatures.

Figure 7:
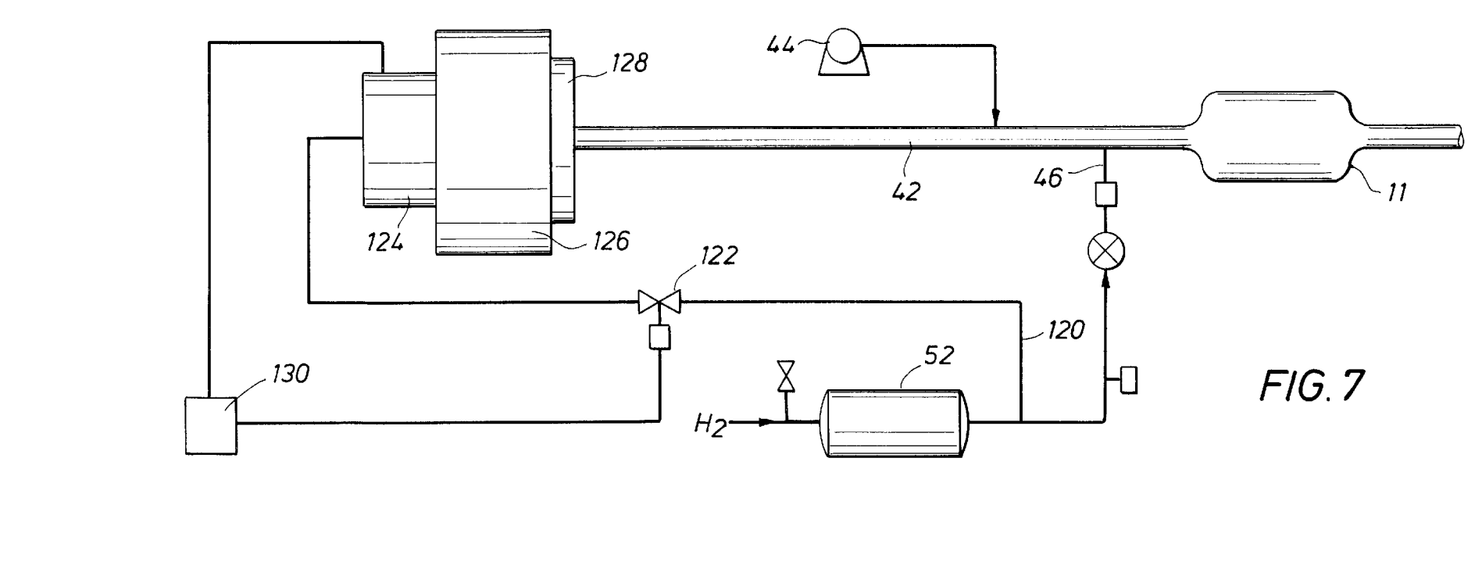
FIG. 7 is a schematic diagram of the apparatus of the present invention depicting a system for the combustion of hydrogen for cold startup assist for an internal combustion engine.

Finally, FIG. 7 depicts an on-board hydrogen ignition assist system of the present invention. A source of hydrogen, such as an electrolyzer as before or any suitable means, fills the hydrogen storage cylinder 52. An ignition supply line 120 taps off the hydrogen line to a control valve 122. The control valve 122 controls the supply of hydrogen into an engine ignition 124. The engine ignition 124 includes the fuel, air, and electrical components for an internal combustion engine 126. Thus, the hydrogen can be supplied at any convenient location so that it is injected into the cylinders of the engine 126. For example, hydrogen under pressure can be supplied to the intake manifold where there is already a fuel/air mixture (during the inlet cycle), or the hydrogen can be mixed with air before it goes into the engines fuel injection system, or other means.

The preferred system of FIG. 7 turns the internal combustion engine 126 into a hydrogen fuel injected engine for the first few seconds of start-up, before any gasoline is introduced into the engine. This way, the catalytic converter can be brought to light-off while the engine is producing no undesirable emissions. Then, when gasoline is finally injected into the system, the catalytic converter is heated to efficient operating temperature.

Expended fuel gases are collected in an output manifold 128 and flow into the exhaust line 42. An ignition control 130 provides control signals to the control valve 122 for the introduction of hydrogen and to the engine ignition 124 to coordinate hydrogen introduction during cold start operations. The on-board hydrogen ignition assist system functions with or without the catalyst conditioning system but is preferably included with such a system since they may both use the hydrogen generation and on-board storage.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A method of heating a catalyst which is to be exposed to reactive organic gases or carbon monoxide, the method comprising the steps of mixing a predetermined quantity of gaseous hydrogen and oxygen in a mixing chamber and introducing the mixture of hydrogen and oxygen to the catalyst to induce spontaneous exothermic combination of the hydrogen and the oxygen by the catalyst to heat the catalyst from a cold condition to light-off temperature for carbon-containing compounds.

2. The method of claim 1 wherein the hydrogen concentration in the mixture of hydrogen and oxygen is in the range of 8–15%.

3. The method of claim 1 wherein the mixture of hydrogen is introduced to the catalyst prior to the introduction of reactive organic gases or carbon monoxide to the catalyst.

4. The method of claim 1 further comprising the step of storing gaseous hydrogen within a hydrogen storage vessel prior to the step of introducing hydrogen.

5. A method of heating a catalyst which is to be exposed to reactive organic gases or carbon monoxide, the method comprising the steps of metering a predetermined quantity of gaseous hydrogen and oxygen and introducing the metered hydrogen and oxygen to the catalyst to induce spontaneous exothermic combination of the hydrogen and the oxygen by the catalyst to heat the catalyst from a cold condition to light-off temperature for carbon-containing compounds.

6. The method of claim 5, further comprising the step of mixing the metered hydrogen and oxygen in a mixing chamber prior to the introduction of the hydrogen and oxygen to the catalyst.

7. The method of claim 5 wherein the hydrogen and oxygen are introduced to the catalyst prior to the introduction of reactive organic gases or carbon monixide to the catalyst.

8. The method of claim 5, wherein the concentration of metered hydrogen to oxygen is approximately in the range of 8–15%.

9. An apparatus for conditioning a catalyst within a catalytic converter from a cold start condition, the apparatus comprising:

a. a hydrogen storage container for storing a quantity of hydrogen;
   b. a source of oxygen;
   c. a mixing chamber for mixing a predetermined quantity of hydrogen from the hydrogen storage container with a predetermined quantity of oxygen from the source of oxygen; and
   d. a conduit coupling the mixing chamber to the catalytic converter.

10. The apparatus of claim 9 further comprising metering the concentration of hydrogen and oxygen in the mixing chamber.

11. The method of claim 4 further comprising the step of generating gaseous hydrogen in an electrolyzer for storage within the hydrogen storage vessel.

12. The method of claim 11 further comprising the step of operating the electrolyzer as necessary to maintain a predetermined pressure in the hydrogen storage vessel.

13. The method of claim 11 further comprising the step of operating the electrolyzer as necessary to restore pressure in the hydrogen storage vessel to a predetermined pressure.

14. The apparatus of claim 9 further comprising an electrolyzer for generating gaseous hydrogen for storage within the hydrogen storage vessel.

15. The apparatus of claim 14 further comprising means for operating the electrolyzer as necessary to maintain a predetermined pressure in the hydrogen storage vessel.

16. The method of claim 14 further comprising means for operating the electrolyzer as necessary to restore pressure in the hydrogen storage vessel to a predetermined pressure.

* * * * *